(12) United States Patent
Huggins et al.

(10) Patent No.: US 11,751,596 B2
(45) Date of Patent: Sep. 12, 2023

(54) EDIBLE COMPOSITIONS INCLUDING FUNGAL MYCELIUM PROTEIN

(71) Applicant: EMERGY INC., Boulder, CO (US)

(72) Inventors: Tyler Huggins, Boulder, CO (US); Justin Whiteley, Chicago, IL (US)

(73) Assignee: Emergy Inc., Boulder, CO (US)

( * ) Notice: Subject to any disclaimer, the term of this patent is extended or adjusted under 35 U.S.C. 154(b) by 22 days.

(21) Appl. No.: 16/435,269

(22) Filed: Jun. 7, 2019

(65) Prior Publication Data

US 2019/0373934 A1     Dec. 12, 2019

Related U.S. Application Data

(60) Provisional application No. 62/682,301, filed on Jun. 8, 2018.

(51) Int. Cl.
| | | |
|---|---|---|
| *A23L 31/15* | (2016.01) | |
| *A23L 33/195* | (2016.01) | |
| *A23L 13/40* | (2023.01) | |
| *A01G 18/20* | (2018.01) | |
| *A23L 33/14* | (2016.01) | |
| *A01G 18/10* | (2018.01) | |
| *A23J 1/00* | (2006.01) | |
| *A23J 1/18* | (2006.01) | |
| *A23J 3/20* | (2006.01) | |
| *A01G 18/70* | (2018.01) | |

(Continued)

(52) U.S. Cl.
CPC .............. *A23L 31/15* (2016.08); *A01G 18/10* (2018.02); *A01G 18/20* (2018.02); *A01G 18/70* (2018.02); *A23J 1/18* (2013.01); *A23J 3/20* (2013.01); *A23L 13/424* (2016.08); *A23L 31/00* (2016.08); *A23L 33/14* (2016.08); *A23L 33/195* (2016.08); *A23P 10/40* (2016.08); *A23V 2002/00* (2013.01)

(58) Field of Classification Search
CPC ................................ A23L 31/00; A23L 31/15
See application file for complete search history.

(56) References Cited

U.S. PATENT DOCUMENTS

| | | |
|---|---|---|
| 3,530,551 A | 9/1970 | Haes et al. |
| 3,969,189 A | 7/1976 | Kobayashi et al. |

(Continued)

FOREIGN PATENT DOCUMENTS

| | | |
|---|---|---|
| CN | 1094258 A | 11/1994 |
| DK | 3292769 T3 | 7/2019 |

(Continued)

OTHER PUBLICATIONS

Wikipedia, "Mycelium", <https://en.wikipedia.org/w/index.php?title=Mycelium&oldid=761708709>, Jan. 24, 2017, 3 pages.

(Continued)

*Primary Examiner* — Stephanie A Cox
(74) *Attorney, Agent, or Firm* — Finnegan, Henderson, Farabow, Garrett & Dunner, LLP

(57) ABSTRACT

An edible meat substitute product includes a fibrous mycelium mass in a range of 10 wt % to 100 wt %. The fibrous mycelium mass has a protein content greater than 40 wt % of a dry mass of the fibrous mycelium mass. The edible meat substitute product includes a water content in a range of 0 w % to 90 wt %.

20 Claims, 8 Drawing Sheets

(51) Int. Cl.
*A23L 31/00* (2016.01)
*A23P 10/40* (2016.01)

(56) References Cited

U.S. PATENT DOCUMENTS

| | | | |
|---|---|---|---|
| 4,212,947 | A | 7/1980 | Torev |
| 4,265,915 | A † | 5/1981 | MacLennan |
| 4,367,240 | A | 1/1983 | Maclennan et al. |
| 5,532,148 | A | 7/1996 | Datta et al. |
| 6,416,978 | B1 | 7/2002 | Lee et al. |
| 7,045,160 | B1 * | 5/2006 | de Haan ............... A23J 1/008 426/574 |
| 7,745,189 | B2 | 6/2010 | Akin et al. |
| 7,855,059 | B2 | 12/2010 | Wenger et al. |
| 8,313,929 | B2 | 11/2012 | Van Wezel et al. |
| 8,343,741 | B2 | 1/2013 | Liu et al. |
| 8,481,295 | B2 | 7/2013 | Van Leeuwen et al. |
| 8,672,245 | B2 | 3/2014 | Finnigan et al. |
| 9,079,786 | B2 | 7/2015 | Van Leeuwen et al. |
| 9,289,003 | B2 | 3/2016 | Kringelum et al. |
| 9,943,096 | B2 | 4/2018 | Fraser et al. |
| 10,010,103 | B2 | 7/2018 | Soni et al. |
| 10,101,103 | B2 † | 10/2018 | Sugg |
| 10,154,627 | B2 | 12/2018 | McIntyre et al. |
| 10,370,636 | B2 | 8/2019 | Van Hee |
| 10,617,697 | B2 | 4/2020 | Levanon et al. |
| 10,661,320 | B2 | 5/2020 | Huang et al. |
| 11,032,982 | B2 | 6/2021 | Ross et al. |
| 11,058,137 | B2 | 7/2021 | Pattillo |
| 11,432,574 | B2 | 9/2022 | Pattillo |
| 11,470,871 | B2 | 10/2022 | Pattillo |
| 11,478,006 | B2 | 10/2022 | Pattillo |
| 2006/0068056 | A1 * | 3/2006 | Sakamoto ............ C12Y 304/11 435/220 |
| 2010/0213293 | A1 * | 8/2010 | Finnigan ............... A23C 9/1203 241/15 |
| 2011/0036107 | A1 | 2/2011 | Muir et al. |
| 2014/0342036 | A1 * | 11/2014 | Appel .................... A23L 7/104 426/18 |
| 2015/0342138 | A1 | 12/2015 | Bayer et al. |
| 2016/0312247 | A1 | 10/2016 | Lennartsson et al. |
| 2018/0303044 | A1 | 10/2018 | Soni et al. |
| 2019/0059431 | A1 | 2/2019 | Kozubal et al. |
| 2019/0030715 | A1 † | 10/2019 | Kozubal |
| 2020/0024577 | A1 | 1/2020 | Carlton et al. |
| 2020/0093155 | A1 | 3/2020 | Pattillo |
| 2021/0059287 | A1 | 3/2021 | Kozubal et al. |
| 2021/0127601 | A9 | 5/2021 | Kaplan-Bie et al. |
| 2021/0171896 | A1 | 6/2021 | Harney et al. |
| 2022/0000159 | A1 | 1/2022 | Pattillo |
| 2022/0117276 | A1 | 4/2022 | Pattillo |
| 2022/0117282 | A1 | 4/2022 | Pattillo |

FOREIGN PATENT DOCUMENTS

| | | |
|---|---|---|
| KR | 100762848 B1 | 10/2007 |
| WO | 2017/151684 † | 9/2017 |
| WO | WO-2017/208255 A1 | 12/2017 |
| WO | WO 2019/121697 A1 | 6/2019 |
| WO | WO-2020/106743 A1 | 5/2020 |

OTHER PUBLICATIONS

Wikipedia, "Protein Digestibility Corrected Amino Acid Score", <https://en.wikipedia.org/w/index.php?title=Protein_Digestibility_Corrected_Amino_Acid_%20Score&oldid=809488538>, Nov. 9, 2017, 4 pages.
International Search Report and Written Opinion for PCT/US2019/036145, dated Oct. 15, 2019, 13 pages.
Bobby B., "How to Cut Salmon Sashimi and Nigiri," Blade Advisor, retrieved from https://bladeadvisor.com/how-to-cut-salmon-sashimi-and-nigiri/, 10 pages (2019).
Cairns, et al., "Moulding the mould: understanding and reprogramming filamentous fungal growth and morphogenesis for next generation cell factories," Biotechnology for Biofuels 12, 77, 18 pages (2019).
Foster, "Here's How (and Why) to Slice Meat Against the Grain," Kitchn, retrieved from https://www.thekitchn.com/heres-exactly-how-to-slice-meat-against-the-grain-and-why-you-should-be-doing-it-meat-basics-215798, 5 pages (2015).
International Search Report & Written Opinion for PCT/US2021/017493 dated Apr. 29, 2021, 7 pages.
International Search Report & Written Opinion for PCT/US2021/017494 dated Apr. 27, 2021, 9 pages.
Markham, et al., "Choline: Its role in the growth of filamentous fungi and the regulation of mycelial morphology," FEMS Microbiology Reviews 10(3-4), pp. 287-300 (1993).
Veiter, et al., "The filamentous fungal pellet—relationship between morphology and productivity," Applied Microbiology and Biotechnology 102, pp. 2997-3006 (2018).
Walisko, et al., "The Taming of the Shrew—Controlling the Morphology of Filamentous Eukaryotic and Prokaryotic Microorganisms," Adv Biochem Eng Biotechnol, pp. 1-27 (2015).
Wiebe, et al., "Effect of Choline on the Morphology, Growth and Phospholipid Composition of Fusarium graminearum," Journal of General Microbiology 135(8), pp. 2155-2162 (1989).
Foreign Search Report on EP 19815723.2 dated May 10, 2022.
Finnigan, T., et al., Sustainable Protein Sources, Elsevier, (2019), Ch. 19, "Mycoprotein: A Healthy New Protein With a Low Environmental Impact," pp. 305-324.
Nair, R.B., et al., "Mycelial pellet formation by edible ascomycete filamentous fungi, *Neurospora intermedia*," AMB Expr. 6:31, pp. 1-10 (2016).
Moo-Young, M., et al., "Fermentation of Cellulosic Materials to Mycoprotein Foods," Biotech. Adv., vol. 11, pp. 469-479 (1993).
Extended European Search Report on EP Patent App. No. 19815723.2 dated May 10, 2022, 9 pages.
Souza Filho, P., et al., "Vegan-mycoprotein concentrate from pea-processing industry byproduct using edible filamentous fungi," Fungal Biol Biotechnol (2018) 5:5, pp. 1-10.

* cited by examiner
† cited by third party

FIG. 6A1
FIG. 6A2
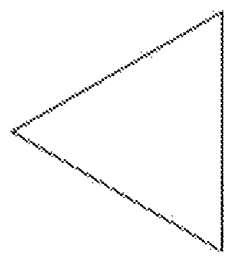
FIG. 6B1
FIG. 6B2
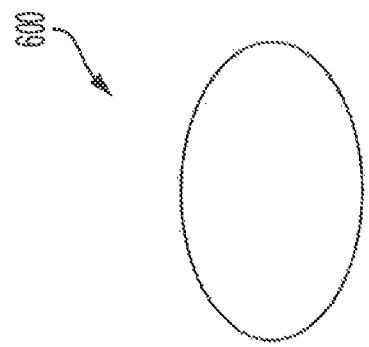
FIG. 6C1
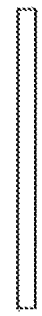
FIG. 6C2

EDIBLE COMPOSITIONS INCLUDING FUNGAL MYCELIUM PROTEIN

CROSS-REFERENCE TO RELATED APPLICATIONS

The present applications claims priority to and benefit of U.S. Provisional Application No. 62/682,301, filed Jun. 8, 2018, the entire disclosure of which is incorporated herein by reference.

STATEMENT OF GOVERNMENT SUPPORT

This invention was made with U.S Government support under Contract No. DE-ACO2-O6CH11357 awarded by the U.S. Department of Energy and under a CRADA (CRADA No 17082) between Emergy LLC and UChicago Argonne ULC as operator of Argonne National Laboratory for the U.S. Department of Energy. The Government has certain rights in the invention.

TECHNICAL FIELD

The present disclosure relates generally the field of fungal mycelium, and more specifically to systems and methods for growing fungal mycelium and forming edible products therefrom.

BACKGROUND

Food and beverage production and processing facilities are one of the leading consumers of water and producers of wastewater in the world. Examples of such facilities include fruit and vegetable processing, meat processing, dairy processing, snack foods processing, and beverage processing facilities amongst others. Water is typically used in these facilities for essential processes such as feedstock processing, washing materials, conveying materials, and cleaning equipment. Therefore, the residual water not consumed in the food and beverage product is generated as runoff streams known as wastewater. Wastewater from food and beverage facilities is extremely high in chemical oxygen demand (COD) and total suspended solids (TSS) making it difficult and expensive to treat. These residual water streams are often viewed as a nuisance to the facility. The only widely implemented solutions are aerobic treatment, anaerobic digestion, and fixed film; the only useful byproducts being power from anaerobic digestion. Given the large capital cost of digesters and other onside treatment technology, wastewater is often discharged directly to the municipal sewer for treatment.

Moreover, demand for edible products that can provide a high protein content which is drawn from a non-animal source is increasing. Driven by increasing awareness of personal health, edible products that include non-animal sourced components such as proteins and fibers are considered as a healthier alternative to animal protein based products. In particular, there is growing demand for edible meat substitutes that mimic meat in its composition and texture but are composed of non-animal components, which can reduce reliance animals such as cows, and reduce the carbon footprint posed by such animals. Thus, there is a need for non-animal protein sources that can facilitate large scale production and adoption of non-animal based edible products.

SUMMARY

Embodiments described herein relate generally to methods for growing fungal mycelium and forming edible food products therefrom.

In some embodiments, an edible meat substitute product includes a fibrous mycelium mass in a range of 10 wt % to 100 wt %. The fibrous mycelium mass has a protein content of greater than 40 wt % of a dry mass of the fibrous mycelium mass. The edible meat substitute product includes a water content in a range of 0 wt % to 90 wt %.

In some embodiments, an edible chip includes an edible body. The edible body includes a fibrous mycelium mass in a range of 0.1 wt % to 90 wt %. The fibrous mycelium mass has a protein content of greater than 40 wt % of a dry mass of the fibrous mycelium mass. The edible chip includes a water content of less than 20 wt %. The edible chip includes a carbohydrate content in a range of 0 wt % to 90 wt %. The fibrous mycelium mass is distributed throughout the edible body.

In some embodiments, a powdered edible product includes a powdered mycelium mass. The powdered mycelium mass has a protein content of greater than 40 wt % of the powdered mycelium mass.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 6A1 and 6A2 illustrate top and side views, respectively, of a food product configured as a chip, according to an embodiment. FIG. 6B1 and 6B2 illustrate top and side views, respectively, of a food product configured as a triangular chip, according to another embodiment. FIG. 6C1 and 6C2 illustrate top and side views, respectively, of a food product configured as an oval chip according to yet another embodiment.

Figure 1:
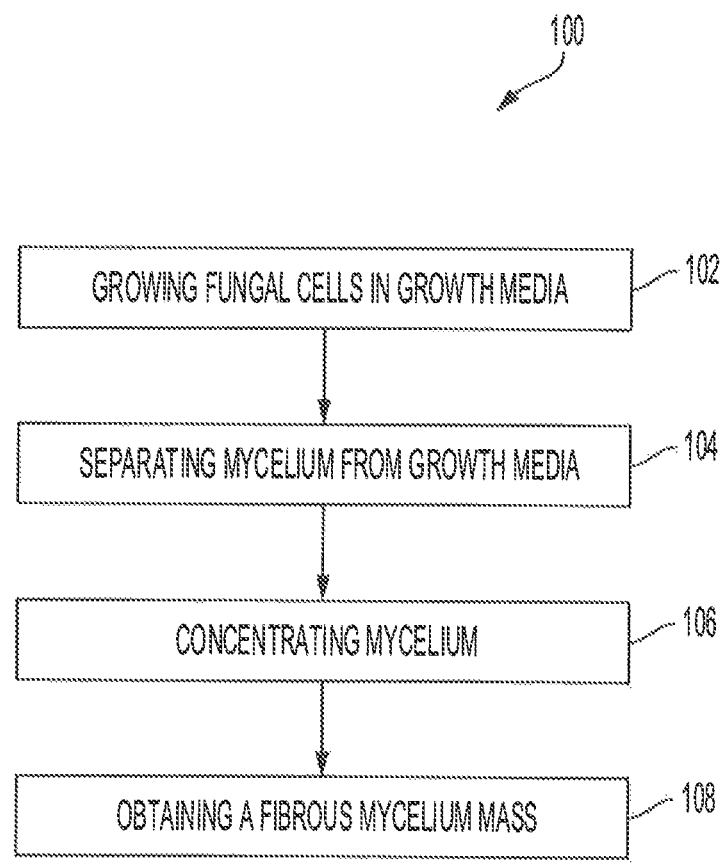
FIG. 1 illustrates a block diagram of an example method for growing fungal mycelium, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to methods for growing fungal mycelium and forming edible products therefrom. Particularly, various embodiments described herein provide methods of growing fungal cells, separating the mycelium, and concentrating the mycelium to obtain a fibrous mass. Various embodiments also relate to adding food additives to produce a biomass and forming the biomass into an edible food product or edible meat substitute product. The edible meat substitute product can include a fibrous mycelium mass having a protein content of greater than 40 wt % of a dry mass of the fibrous mycelium.

Various embodiments of the methods of growing fungal mycelium and forming edible products therefrom may provide one or more benefits including, for example: (1) providing batch or continuous process culture of fungal mycelium; (2) growing fungal mycelium in brewery waste water or other waste water streams, allowing for recycling as well as cleanup of waste water; (3) providing edible products that include protein from a non-animal source, i.e., fungal mycelium, thereby reducing dependence on animal sources of proteins and reducing their carbon footprint; and (4) providing edible meat substitute products that feel and taste like real meat while delivering a high protein content.

The fungal mycelium can include fungi from Ascomycota and Zygomycota, including the genera *Aspergillus, Fusarium, Neurospora*, and *Monascus*. Other species include edible varieties of Basidiomycota and genera *Lentinula*. One genus is *Neurospora*, which is used in food production through solid fermentation. The genus of *Neurospora* are known for highly efficient biomass production as well as ability to break down complex carbohydrates. For certain species of *Neurospora*, no known allergies have been detected and no levels of mycotoxins are produced. In addition to monocultures of filamentous fungi, multiple strains can be cultivated at once to tune the protein, amino acid, mineral, texture, and flavor profiles of the final biomass.

FIG. 1 illustrates a block diagram of an example method for growing fungal mycelium, according to an embodiment. In brief overview, the method 100 may include growing fungal cells in a growth media, at 102. The method 100 may include separating mycelium from the growth media, at 104. The method 100 may include concentrating mycelium, at 106. The method 100 may include obtaining a fibrous mycelium mass, at 108.

In further detail, the method 100 may include growing fungal cells in a growth media, at 102. For example, the growth media may be contained in a vessel, such as a vat capable of growing several kilograms of the fungal mycelium. The growth media can be referred as an original growth media. The method 100 may include growing fungal cells in a growth media such that the fungal cells produce mycelium. The growth media can include nutrients (e.g., sugar, nitrogen-containing compounds, or phosphate-containing compounds). The growth media can include a sugar, a nitrogen-containing compound, and a phosphate-containing compound. The sugar can be in the range of 5-50 g/L. For example, the sugar can be 5 g/L, 10 g/L, 20 g/L, 30 g/L, 40 g/L, or 50 g/L, inclusive. The sugar can include sucrose, glucose, fructose, molasses, or a mixture of sugars. The nitrogen-containing compound can be in the range of 0.5-10 g/L. For example, the nitrogen-containing compound can be 0.5 g/L, 1 g/L, 2 g/L, 3 g/L, 4 g/L, 5 g/L, or 10 g/L, inclusive. The nitrogen-containing compound can include ammonium hydroxide, ammonium nitrate, ammonium sulfate, ammonium chloride, urea, yeast extract, peptone, or a mixture of nitrogen-containing compounds. The phosphate-containing compound can be in the range of 0.1-5 g/L. For example, the phosphate-containing compound can be 0.1 g/L, 0.2 g/L, 0.3 g/L, 0.4 g/L, 0.5 g/L, 1 g/L, 2 g/L, 3 g/L, 4 g/L, or 5 g/L, inclusive. The phosphate-containing compound can be potassium phosphate, sodium phosphate, phosphoric acid, or a mixture of phosphate-containing compounds.

The fungal cells can be grown at a temperature between 25° C.–40° C., inclusive. The fungal cells can be grown for between 12 hours and 48 hours, inclusive. Growing fungal cells can produce a yield of 5-20 g/L of fungal cell dry weight. The mycelium can have a protein content of greater than 40 wt % (dry weight). In some embodiments, the mycelium may have a protein content of 50-65%, inclusive (dry weight). The mycelium can have a combined methionine and cysteine content of at least 25 mg/g crude protein.

In some embodiments, the method 100 may include removing a volume of a broth. The broth can contain the fungal cells and the growth media. Removing a volume of broth can include discretely removing a volume of broth. For example, a volume of broth can be siphoned from a container containing the broth in a batch process, or be continuously removed from the broth. For example, a volume of broth can flow out of the container containing the broth in a continuous process.

The method 100 may include adding fresh growth media to a container containing the broth. The broth can be a fermentation broth. Nutrients (e.g., sugar, phosphate-containing compound, or nitrogen-containing compound) can be added in a batch growth configuration. For example, the nutrients can be added after a predetermined amount of time (e.g., after 1 hour, 2 hours, 3 hours, 6 hours, or 12 hours). The concentrations of none or at least one of the nutrients of the fresh growth media can be brought to the concentrations of nutrients of the original growth media described in operation 102. The fresh growth media can have a volume that is greater than, less than or equal to a volume of growth media that was lost from the original growth media during growth of the fungal cells in the original growth media.

In one example, after 6 hours, the concentration of sugar, phosphate-containing compound, and nitrogen-containing compound in the fresh growth media is increased. Nutrients are added to bring the concentrations of sugar, phosphate-containing compound, and nitrogen-containing compound of the broth to the concentrations of sugar, phosphate-containing compound, and nitrogen-containing compound, respectively of the original growth media.

In one example, after at least 12 hours, 50-95% of the broth can be removed. Fresh media can be added containing nutrients (e.g., sugar, phosphate-containing compound, or nitrogen-containing compound). The nutrient concentration of the broth can be increased by added fresh growth media.

Nutrients can be added in a continuous growth configuration. For example, a volume of broth (e.g., 0.01 vol %, 1 vol %, 5 vol %, 10 vol %, 25 vol %, 50 vol %, or 95 vol %, inclusive) can be removed from the container containing the fungal cells and the growth media. Fresh growth media can be added to the container containing the broth. The fresh growth media can be provided as a continuous flow. The volume of the broth in the container can be monitored to stay at a specified level. For example, the volume of the broth in the container can stay at a fixed volume. The volume of fresh growth media that is added can be equal to the volume of broth that is lost from the container.

The method 100 includes separating mycelium from the growth media, at 104. Separating the mycelium from the growth media can be performed using gravity straining, centrifugation, a belt press, a filter press, a mechanical press, a drum dryer, or any other suitable process. During the separation process, the mycelium can be washed with water, ethanol, acid, base or other solvent. Recovered filtrate can be reused or discarded. The mycelium can have a moisture content between 65% and 95%. Cell walls of the mycelium can be disrupted, for example, through lysing. Lysis may be performed by adjusting the pH to below 4 or above 9, by adding lysis enzymes, by raising the temperature to between 40° C. and 60° C. for between 1 and 24 hours, or any other suitable lysis method. Following separation, additives (e.g., food additives) can be mixed with the mycelium. Additives can include vegetable or animal proteins, fats, emulsifiers, thickeners, stabilizers, and flavoring, for example, when the mycelium is being formed into an edible product.

The method 100 may include concentrating the mycelium, at 106. Concentrating the mycelium may include increasing a proportion or level of a fibrous mycelium mass obtained after separating from the growth media. For example, concentrating the mycelium may include dehydrating the mycelium by dewatering the mycelium. For example, the mycelium can be thermally dried, for example, to a moisture content of less than 70%. The mycelium can be thermally dried at a specified temperature (e.g., 30° C., 50° C., 75° C., or 90° C., inclusive). In some embodiments, the mycelium can be thermally dried with forced air. In some embodiments, dewatering the mycelium can include applying a mechanical force (e.g., a press, a sieve) to remove water from the mycelium. Dehydrating (e.g., via thermal or mechanical drying) the mycelium can produce a partially dry fibrous mycelium mass. The partially dry fibrous mycelium mass can be ground to reduce particle size, for example, to create a powder.

The method 100 includes obtaining the fibrous mycelium mass, at 108. The fibrous mycelium mass can have a protein content of greater than 40 wt % of a dry mass of the mycelium. For example, the fibrous mycelium mass can have a protein content of 45 wt %, 50 wt %, 60 wt %, 70 wt %, 80 wt %, or 90 wt %, inclusive of the dry mass of the mycelium.

Following are some examples of growing fungi and obtain a fibrous mycelium mass therefrom having a protein content of greater than 40 wt %. These examples are for illustrative purposes only and should not be construed as limiting the disclosure in any shape or form.

In one example, *Neurospora crassa* (*N. crassa*) was grown in batch configuration in a 10 L benchtop reactor. *N. crassa* is first grown on agar slants and incubated for 3 days at 32° C. Conidia or spores of the *N. crassa* are transferred to a 250 mL vented Fernbach flask and grown for 48 hours on an orbital shaker table at 32° C. The resulting mycelium is aseptically transferred to a benchtop 10 L reactor containing the following media: 20 g/L sucrose, 2 g/L ammonium nitrate, 2 g/L potassium phosphate monobasic, 1 g/L sodium nitrate, 0.2 g/L magnesium sulfate, 0.1 g/L calcium chloride, and trace elements. Aeration is set at 0.75 vvm and agitation at 250 rpm. The pH is adjusted and held at 5.8 using a 6 N sodium hydroxide buffer. After 24 hours, the mycelium is harvested using a cheese cloth, dewatered in a cider press, and completely dried in a dehydrator set at 74° C. The total cell dry weight is 9.5 g/L. Protein analysis yields a crude protein content of 57 wt %. Amino acid analysis yields a PDCAAS score of 1.0 for the fibrous mycelium mass. The fibrous mycelium mass has a combined methionine and cysteine content of 26 mg/g crude protein.

In another example, *N. crassa* was grown in batch configuration in a 10 L benchtop reactor. *N. crassa* is first grown on agar slants and incubated for 3 days at 32° C. Conidia or spores of the *N. crassa* are transferred to a 250 mL vented fernbach flask and grown for 48 hours on an orbital shaker table at 32° C. The resulting mycelium is aseptically transferred to a benchtop 10 L reactor containing the following media: 20 g/L sucrose, 2 g/L ammonium nitrate, 1 g/L potassium phosphate monobasic, 0.2 g/L magnesium sulfate, 0.1 g/L calcium chloride, and trace elements. Aeration is set at 0.75 vvm and agitation at 250 rpm. The pH is adjusted and held at 5.8 using a 6 N sodium hydroxide buffer. After 24 hours, the mycelium is harvested using a cheese cloth, dewatered in a cider press, and completely dried in a dehydrator set at 74° C. The total cell dry weight is 9 g/L. Protein analysis yields a crude protein content of 55 wt %. Amino acid analysis yields a PDCAAS score of 1.0 for the fibrous mycelium mass. The fibrous mycelium mass has a combined methionine and cysteine content of 26 mg/g crude protein.

In another example, *N. crassa* was grown in batch configuration in a 10 L benchtop reactor. *N. crassa* is first grown on agar slants and incubated for 3 days at 32° C. The conidia is transferred to a 250 mL vented Fernbach flask and grown for 48 hours on an orbital shaker table at 32° C. The resulting mycelium is aseptically transferred to a benchtop 10 L reactor containing the following media: 30 g/L sucrose, 3 g/L ammonium nitrate, 1 g/L potassium phosphate monobasic, 0.2 g/L magnesium sulfate, 0.1 g/L calcium chloride, and trace elements. Aeration is set at 0.75 vvm and agitation at 250 rpm. The pH is adjusted and held at 5.8 using a 6 N sodium hydroxide buffer. After 24 hours, the mycelium is harvested using a cheese cloth, dewatered in a cider press, and completely dried in a dehydrator set at 74° C. The total cell dry weight is 11 g/L. Protein analysis yields a crude protein content of 63 wt %. Amino acid analysis yields a PDCAAS score of 1.0 for the fibrous mycelium mass. The fibrous mycelium mass has a combined methionine and cysteine content of 27 mg/g crude protein.

In another example, *N. crassa* was grown in batch configuration in a 10 L benchtop reactor. *N. crassa* is first grown on agar slants and incubated for 3 days at 32° C. The conidia is transferred to a 250 mL vented Fernbach flask and grown for 48 hours on an orbital shaker table at 32° C. The resulting mycelium is aseptically transferred to a benchtop 10 L reactor containing the following media: 20 g/L sucrose, 3.25 g/L urea, 1 g/L potassium phosphate monobasic, 0.2 g/L magnesium sulfate, 0.1 g/L calcium chloride, and trace elements. Aeration is set at 0.75 vvm and agitation at 250 rpm. The pH is adjusted and held at 5.8 using a 6 N sodium hydroxide buffer. After 24 hours, the mycelium is harvested using a cheese cloth, dewatered in a cider press, and completely dried in a dehydrator set at 74° C. The total cell dry weight is 8.5 g/L. Protein analysis yields a crude protein content of 56 wt %. Amino acid analysis yields a PDCAAS score of 1.0. The fibrous mycelium mass has a combined methionine and cysteine content of 25 mg/g crude protein.

In another example, N. crassa was grown in batch configuration in a 10 L benchtop reactor. N. crassa is first grown on agar slants and incubated for 3 days at 32° C. The conidia is transferred to a 250 mL vented Fernbach flask and grown for 48 hours on an orbital shaker table at 32° C. The resulting mycelium is aseptically transferred to a benchtop 10 L reactor containing the following media: 20 g/L sucrose, 2 g/L ammonium nitrate, 1 g/L potassium phosphate monobasic, 0.2 g/L magnesium sulfate, 0.1 g/L calcium chloride, and trace elements. Aeration is set at 0.75 vvm and agitation at 250 rpm. The pH is adjusted and held at 5.8 using a 15% ammonium hydroxide buffer. After 24 hours, the mycelium is harvested using a cheese cloth, dewatered in a cider press, and completely dried in a dehydrator set at 74° C. The total cell dry weight is 10 g/L. Protein analysis yields a crude protein content of 60 wt %. Amino acid analysis yields a PDCAAS score of 1.0. The fibrous mycelium mass has a combined methionine and cysteine content of 26 mg/g crude protein.

In another example, N. crassa was grown in batch configuration in a 10 L benchtop reactor. N. crassa is first grown on agar slants and incubated for 3 days at 32° C. The conidia is transferred to a 250 mL vented Fernbach flask and grown for 48 hours on an orbital shaker table at 32° C. The resulting mycelium is aseptically transferred to a benchtop 10 L reactor containing the following media: 20 g/L sucrose, 2 g/L ammonium nitrate, 1 g/L potassium phosphate monobasic, 0.2 g/L magnesium sulfate, 0.1 g/L calcium chloride, and trace elements. Aeration is set at 0.75 vvm and agitation at 250 rpm. The pH is adjusted and held at 5.8 using a 6 N sodium hydroxide buffer. After 12 hours, 10 g/L sucrose and 1 g/L ammonium nitrate is added to the system. After 24 hours total, the mycelium is harvested using a cheese cloth, dewatered in a cider press, and completely dried in a dehydrator set at 74° C. The total cell dry weight is 12 g/L. Protein analysis yields a crude protein content of 60 wt %. Amino acid analysis yields a PDCAAS score of 1.0 for the fibrous mycelium mass. The fibrous mycelium mass has a combined methionine and cysteine content of 26 mg/g crude protein.

In another example, N. crassa was grown in batch configuration in a 10 L benchtop reactor. N. crassa is first grown on agar slants and incubated for 3 days at 32° C. The conidia is transferred to a 250 mL vented Fernbach flask and grown for 48 hours on an orbital shaker table at 32° C. The resulting mycelium is aseptically transferred to a benchtop 10 L reactor containing the following media: 20 g/L sucrose, 2 g/L ammonium nitrate, 1 g/L potassium phosphate monobasic, 0.2 g/L magnesium sulfate, 0.1 g/L calcium chloride, and trace elements. Aeration is set at 0.75 vvm and agitation at 250 rpm. The pH is adjusted and held at 5.8 using a 6 N sodium hydroxide buffer. After 24 hours, 90% of the media is harvested; new media is added in the concentrations of above to bring the total system back to 10 L. The new sequential batch time is reduced to 12 hours. Every 12 hours 90% is harvested and the fed-batch process is repeated again. The process was carried out for 60 hours. The harvested cell dry weight is 9.5 g/L. Protein analysis yields a crude protein content of 60 wt %. Amino acid analysis yields a PDCAAS score of 1.0 for the fibrous mycelium mass. The fibrous mycelium mass has a combined methionine and cysteine content of 26 mg/g crude protein.

In another example, N. crassa was grown in batch configuration in a 10 L benchtop reactor. N. crassa is first grown on agar slants and incubated for 3 days at 32° C. The conidia is transferred to a 250 mL vented Fernbach flask and grown for 48 hours on an orbital shaker table at 32° C. The resulting mycelium is aseptically transferred to a benchtop 10 L reactor containing the following media: 20 g/L sucrose, 2 g/L ammonium nitrate, 1 g/L potassium phosphate monobasic, 0.2 g/L magnesium sulfate, 0.1 g/L calcium chloride, and trace elements. Aeration is set at 0.75 vvm and agitation at 250 rpm. The pH is adjusted and held at 5.8 using a 6 N sodium hydroxide buffer. After 24 hours, 90% of the media is harvested; new media is added in the concentrations of above to bring the total system back to 10 L. The new sequential batch time is reduced to 12 hours. Every 12 hours 90% is harvested and the fed-batch process is repeated again. The process was carried out for 60 hours. Following straining with cheese cloth and pressing, all media is collected, autoclaved and reused by only adding 20 g/L sucrose, 2 g/L ammonium nitrate, and 1 g/L potassium phosphate monobasic. The repeated fed-batch process is carried out for 60 hours total. The harvested cell dry weight is 9.5 g/L. Protein analysis yields a crude protein content of 60 wt %. Amino acid analysis yields a PDCAAS score of 1.0 for the fibrous mycelium mass. The fibrous mycelium mass has a combined methionine and cysteine content of 26 mg/g crude protein.

A method of cell maintenance and isolation of conidia is described herein. Neurospora crassa (N. crassa) wild-type strain (FGSC #4815) was purchased from the fungal genetic stock center. The cells used for inoculations were stored on agar slants composed of 2% Vogel's 50× salts, 0.01% trace elements solution, 0.005% biotin, 1.5% sucrose, and 1.5% agar at −20° C. Growth experiments were started from cells removed from frozen agar slants onto new agar slants incubated at 30° C. for 2-3 days in complete darkness. Conidia were isolated from slants using standard methods and inoculated into 100 mL of fresh Vogel's medium (2% Vogel's 50× salts, 0.01% trace elements solution, 0.005% biotin, and 1.0% glucose) for batch submerged culture experiments. Conidial suspensions (1 mL in Vogel's medium) between optical densities of ~0.7 were added to each culture.

A method of batch growth is described herein. Growth experiments were conducted in 1 L of fresh residual water. Batch cultures were incubated at 30° C. for 1-3 days (120 rpm) under constant light. Harvesting of biomass was performed using a vacuum filtration flask and then subsequently dried at 105° C.

The crude protein content of the filamentous fungus can be increased by supplementing with additional nitrogen sources. Non-limiting examples include supplementing with gaseous ammonia, liquid ammonia, ammonium nitrate, ammonium sulfate, sodium nitrate, yeast extract, urea, peptone, or other organic nitrogen source. A nitrogen source can be added with other pH buffering components. Non-limiting examples include acids, phosphates, borates, sulfates, and bases.

In some embodiments, the fungal mycelium can be grown using growth media from food-grade water streams generated at food and beverage processing facilities. For example, the methodologies and materials described herein may be used for water streams generated at breweries that might include residual water streams from the brewery, spent yeast, equipment washes, packaging, or a mixture thereof. The fungal mycelium can be grown from growth media from other industries where food grade processes occur, and residual water streams are generated with significant levels of sugars, nutrients, and organics. As a non-limiting example, the following is a list of suitable food and beverage facilities for the production of food grade residual water streams: brewery, winery, distillery, energy drink, soda, fruit drink, potato processing, dairy production, meat processing, candy, baked goods, or mixtures thereof. Residual food grade water can be collected to use as a growth media for cultivating filamentous fungi, the biomass of which can be used for multiple products including but not limited to, edible protein, chemical extraction, or materials. In other embodiments, the fungal mycelium may be grown in a suitable culture media with controlled amounts of nutrients to enhance culture efficiency of the mycelium.

Breweries are segmented into different classifications based on yearly production capacity. Beer is measured in terms of barrel (bbl), 1 bbl to equivalent to 31 gallons. Microbreweries are generally regarded as producing less than 5,000 bbl year$^{-1}$, a craft brewery producing between 5,000 and 1,000,000 bbl year$^{-1}$, and a domestic brewery producing more than 1,000,000 bbl year$^{-1}$. Breweries use a significant amount of water within their facilities for the production of product but also washing equipment. Residual water streams are generated from the brewery, spent yeast, fermenter wash, filtering, and packaging processes. The generated residuals are typically regarded as food grade outside of chemical rinsing of equipment and packaging. The residual streams are also extremely high in chemical oxygen demand (COD) and total suspended solids (TSS), usually exceeding 20,000 mg L$^{-1}$ and 10,000 mg L$^{-1}$, respectively. Depending upon the brewery size, the residual water can be disposed of in different manners. For most microbreweries and craft breweries, residual water can be discharged to the sewer and a fee is imposed by the local municipality based on the COD and TSS concentration of the water. For larger crafts and domestics, residual water is usually diverted to an onsite wastewater treatment facility. The residual water generated at these facilities often contain the nutrients required for filamentous fungi growth or need to be supplemented with additional nutrients.

Figure 2:
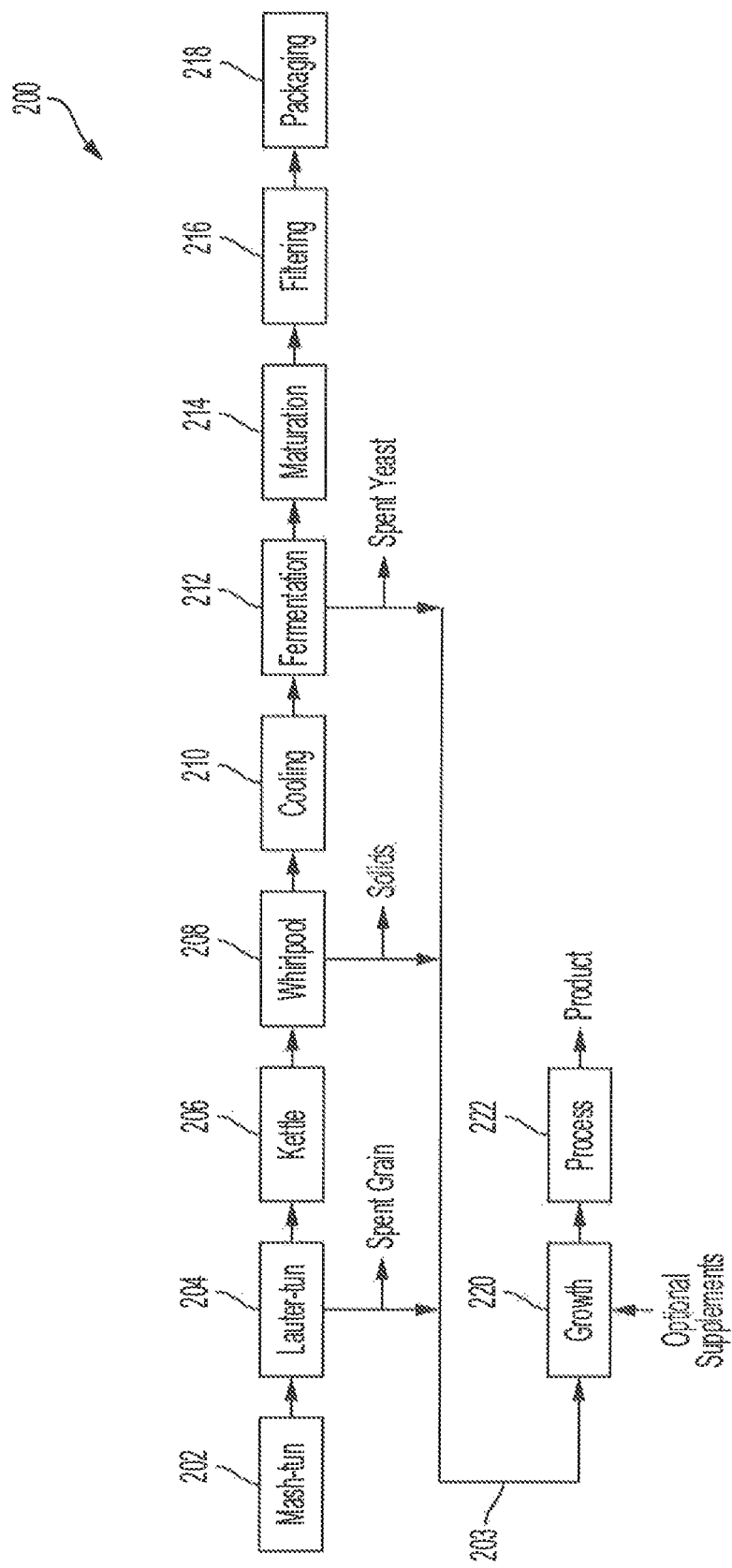
FIG. 2 illustrates a process flow diagram of a brewery, according to an embodiment.

FIG. 2 illustrates a brewery process 200, according to an embodiment. The brewery process diagram includes a schematic of how fungi growth methods described herein might integrate into a commercial brewery. Certain residual water streams have been identified to have more optimized nutrient profiles than others.

The brewery process 200 can include a mash tun 202. The mash tun 202 can include a brewery vessel used for mixing ground malt with temperature controlled water. The brewery process 200 can include mashing the malt in the mash tun 202. The brewery process 200 can include a lauter tun 204. The lauter tun 204 can include a vessel configured to perform lautering, i.e., separating the mash into clear liquid wort and residual grain. Residual water 203 can be removed from the lauter tun 204 to provide growth media for growing fungal cells.

The brewery process 200 can include a kettle 206. The kettle 206 can include a container for boiling the wort with hops and other flavorings. The kettle 206 can be made of copper. The brewery process 200 can include a whirlpool 208. The whirlpool 208 can include a vessel in which solid particles in the hopped wort are separated out. The whirlpool 208 can also include a settling tank. Residual water 203 can be removed from the whirlpool 208 to provide growth media for growing fungal cells.

The brewery process 200 can include cooling the wort 210. The brewery process 200 can include fermentation 212. Residual water 203 can be removed after the fermentation 212 to provide growth media for growing fungal cells. The brewery process 200 can include maturation 214. The brewery process can include filtrating 216. The brewery process 200 can include packaging 218.

As described herein, the residual water 203 can be used as a growth media for fungal cells. The fungal cells can undergo a growth process 220. The growth process 220 can include optional supplements (e.g., sugars, phosphate-containing compounds, nitrogen-containing compounds). The fungal calls can be processed 222 to produce a biomass or product.

Filamentous fungi are typically cultivated in the laboratory in a synthetic solution known as Vogel's Solution. Table 1 shows an elemental analysis of Vogel's Solution and residual water from brewery as determined by inductively coupled plasma optimal emission spectroscopy (ICP-OES). All values are expressed in mg/L. The elemental analysis provided by Table 1 depicts residual water from the brewery of a microbrewery. Residual brewery water contains necessary nutrients for proper filamentous fungi growth. This data also reveals that the significant quantities of nutrients used in Vogel's Solution are not necessary for proper fungi growth.

TABLE 1

Elemental analysis of Vogel's solution and residual water from a brewery.

| | Total Organic Carbon | Total Nitrogen | Na | Mg | P | S | K | Ca | Mn | Fe | Cu | Zn |
|---|---|---|---|---|---|---|---|---|---|---|---|---|
| Vogel | 7992 | 699 | 590 | 20 | 1137 | 26 | 1436 | 0.35 | 0.02 | 0.14 | 0.06 | 1.14 |
| Brewery | 9212 | 20 | 40 | 30 | 97 | 22 | 130 | 16 | 0.11 | 0.04 | 0.05 | 0.07 |

The constituents in the brewery water stream are very similar to Vogel's and contain a necessary amount of each essential organic and mineral for cultivation of filamentous fungi. The brewery water stream can be collected and stored in a fermentation vessel. Fungal spores can be added and incubated for 6-72 hours, inclusive at 20-40° C., inclusive. Being from a food-grade stream, the final filamentous fungi can then be used for human consumption, broken down into individual chemicals such as chitin or chitosan, or used as a feedstock for materials production such but not limited to activated carbon. The water that the fungal biomass is cultivated in can be sufficiently purified of both COD and TSS. Therefore, the water may be reused at the food and beverage facility for certain applications.

While the residual water stream from the brewery can be used as-is, fungal growth efficiency can be maximized by adding additional nutrients and supplements. Supplements include but are not limited to a nitrogen source, trace metal sources, phosphorus source, potassium source, magnesium source, sulfate source, vitamins, or a mixture thereof. Most large-scale food and beverage facilities produce only a single product therefore the composition of residual food-grade water streams remain consistent. For smaller facilities (e.g., a craft brewery), knowledge of the particular beer being brewed can indicate what elemental sources are present and what additional nutrients need to be supplemented. Supplementation can have the dual purpose of enhancing growth efficiency as well as fortifying final mineral content of biomass for food and materials production purposes. Certain supplementations can lead to alterations of the crude protein levels and amino acid profile. Supplementation can include a pH buffer that consists of a nitrogen source.

The spent yeast generated at a brewery can be used as a sole supplement in either Vogel's solution, in other residual water streams, or singularly. The spent yeast can either be inactivated, lysed, or alive at the time of supplementation. Filamentous fungi can break down yeast to be used as carbon, nitrogen, and nutrient source.

In addition to residual water sources from a single facility, water sources from multiple facilities may be blended to optimize a fermentation media. Other residual solid nutrient sources from food and beverage facilities can also be added. An example would be the addition of coffee grounds to residual brewery water.

The food-grade residual water streams may be sterilized before or after collection of the food-grade residual water stream. The food-grade residual water streams may be sterilized using sterilization techniques such as ozone, heat, ultraviolet (UV), and hydrogen peroxide. For other applications such as production of activated carbon from fungal mycelium, iodine or chlorine dioxide can be used for sterilization of growth media.

Figure 3:
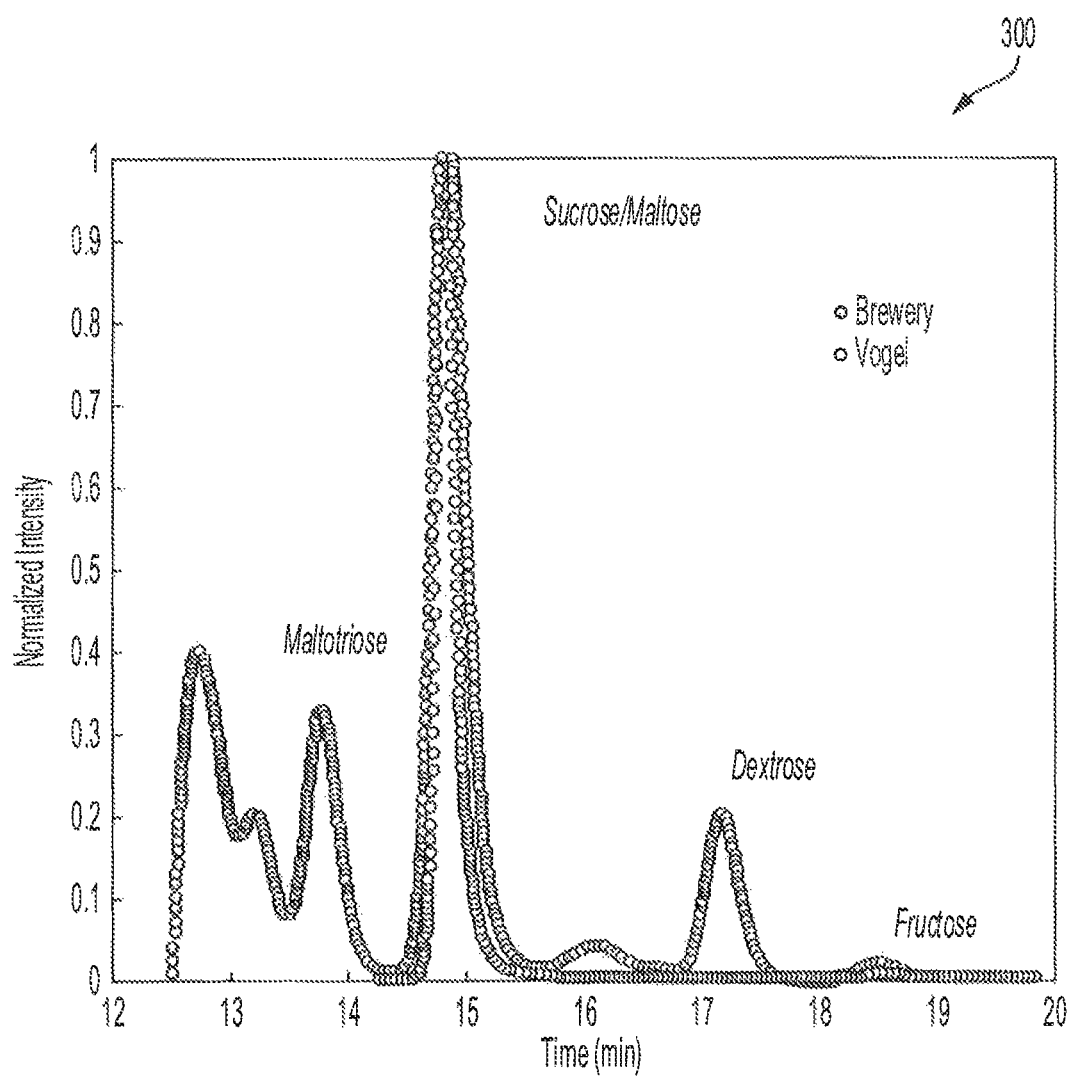
FIG. 3 illustrates high performance liquid chromatography (HPLC) scans of Vogel's Solution and residual water from a brewery, according to an embodiment.

FIG. 3 illustrates high performance liquid chromatography (HPLC) scans of Vogel's Solution and residual water from a brewery. The HPLC scans show the intensity normalized to the sucrose/maltose peak for residual water from the brewery and Vogel's Solution. The maltotriose peak is more intense for residual water from the brewery than for Vogel's Solution. Furthermore, the dextrose peak is more intense for residual water from the brewery than for Vogel's Solution, and the fructose peak is more intense for residual water from the brewery than for Vogel's Solution.

Figure 4:
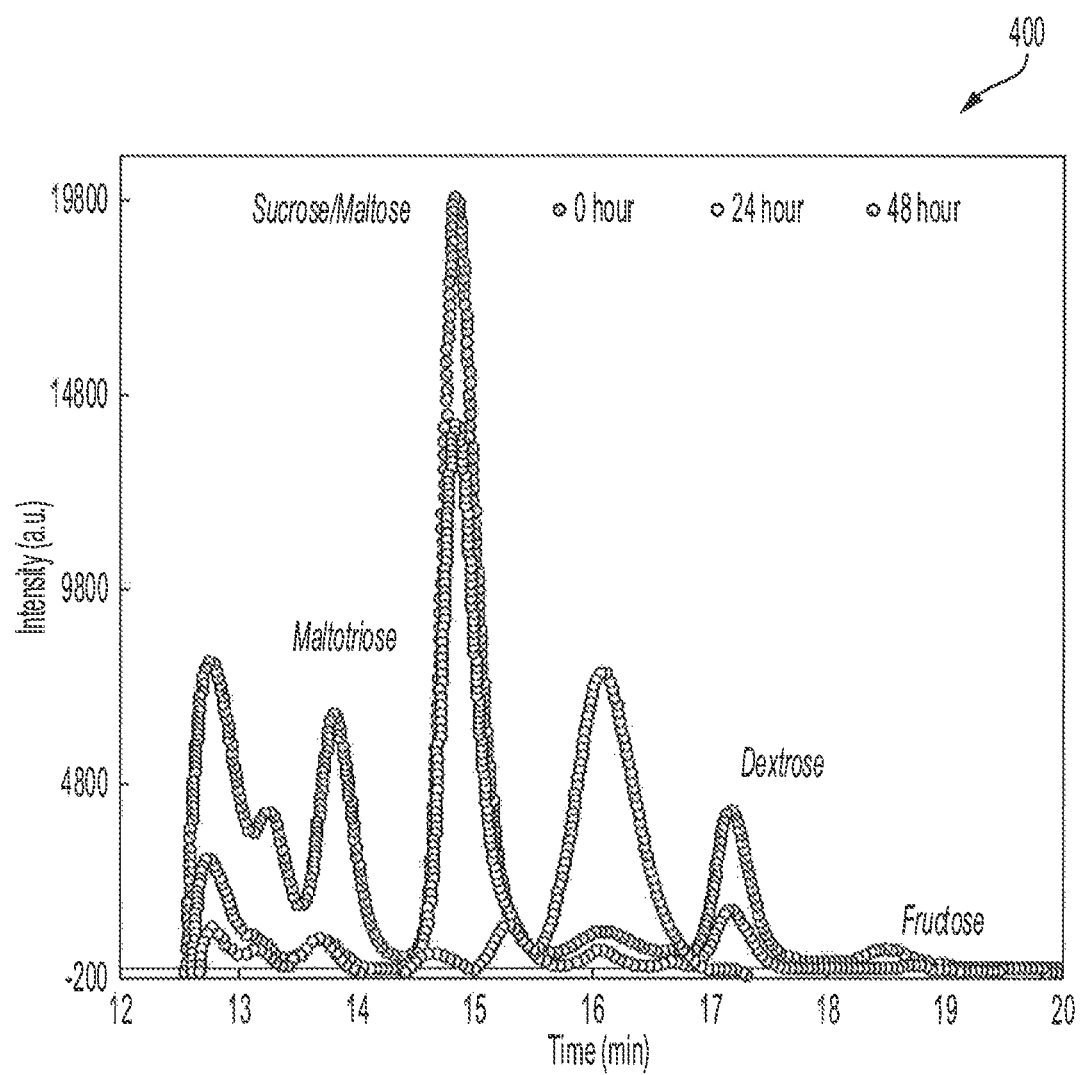
FIG. 4 illustrates HPLC scans of *N. crassa* growth in residual water from a brewery, according to an embodiment.

FIG. 4 illustrates HPLC scans of N. crassa growth in residual water from a brewery. The HPLC scans show N. crassa growth in residual water over the course of 48 hours. The sucrose/maltose peak is more intense at 0 hours than at 24 hours and 48 hours. The maltotriose peak is more intense at 0 hours than at 24 hours and 48 hours, the dextrose peak is more intense at 0 hours than at 24 hours and 48 hours, and the fructose peak is more intense at 0 hours than at 24 hours and 48 hours.

In one example, brewery residual water was collected from a microbrewery in Illinois. The water stream is leftover from the initial beer making stream and is therefore food-grade. Growth experiments were performed over a 48 hour period. FIG. 4 presents HPLC data over the course of growth of N. crassa. Almost all sugars including fructose, dextrose, sucrose, maltose, maltotriose, and greater maltodextrins are consumed. This is the first time the greater maltodextrins are shown to be suitable carbon sources in fermentation media. Table 2 summarizes the yield properties as well as reduction in COD, TOC, and total nitrogen (TN). This example demonstrates the ability to use this specific food-grade water source as a full fermentation media for growing fungal mycelium.

TABLE 2

Water properties of residual water from brewery and reduction during N. crassa growth over 48 hours.

| | COD (mg L$^{-1}$) | TOC (mg L$^{-1}$) | TN (% removal) | Biomass Yield (g L$^{-1}$) |
|---|---|---|---|---|
| 0 hour | 19370 | 7200 | 0 | 0 |
| 24 hour | 14835 | 5025 | 80 | 3.64 |
| 48 hour | 11760 | 4185 | 100 | 4.9 |

In another example, brewery residual water and live yeast were collected from a microbrewery in Illinois. The water stream is left over from the initial beer making stream and the yeast is left over from the beer making process; therefore, both are food-grade. The yeast were killed using autoclave. Increasing amounts of yeast were added to the residual water and used as fermentation media for N. crassa. Table 3 presents the yield data associated with this experiment. The final biomass yield from yeast addition exceeds the raw fungal yield plus the amount of yeast added to the start. This example demonstrates the ability to integrate yeast and other organic solids into the media and for N. crassa to use dead yeast as a nutrient source.

TABLE 3

Effect of dead yeast addition to biomass yield of N. crassa growth in residual water from brewery.

| Dead Yeast Addition | Dead Yeast (g) | Yield (g L$^{-1}$) |
|---|---|---|
| 0 | 0 | 4.88 |
| 5% | 0.05 | 4.96 |
| 10% | 0.1 | 5.11 |
| 20% | 0.2 | 6.23 |

In another example, brewery residual water and spent grain fines were collected from a microbrewery in Illinois. The water stream is left over from the initial beer making stream and the spent grain fines is left over from the beer making process; therefore, both are food-grade. Increasing amounts of spent grain fines were added to the residual water and used as fermentation media for N. crassa. Table 4 presents the yield data associated with this experiment. The final biomass yield from spent grain fines addition exceeds the raw fungal yield plus the amount of fines added to the start. This example demonstrates the ability to integrate spent grain into the media and for N. crassa to use the spent grain as a nutrient source.

TABLE 4

Effect of spent grain addition to biomass yield of N. crassa growth in residual water from brewery.

| Spent Grain Addition | Spent Grain (g) | Yield (g L$^{-1}$) |
|---|---|---|
| 0 | 0 | 4.8 |
| 12 mL | 0.16 | 4.9 |
| 15 mL | 0.18 | 5.4 |
| 18 mL | 0.21 | 6.9 |

In another example, brewery residual water was collected from a microbrewery in Illinois. The water stream is left over from the initial beer making stream and is therefore food-grade. Growth experiments were performed over a 48 hour period. As a supplement, the 50× salts portion of Vogel's media was added in proper concentration to the residual water stream to act as a nutrient source. Table 5 presents the yield data associated with this experiment. The final biomass yield from the 50× addition is greater than unsupplemented. This example demonstrates the ability to use residual brewery water as a carbon source in fermentation media for growing fungal mycelium.

TABLE 5

Addition of 50X Vogel's salt solution to residual water from brewery and corresponding biomass yields of *N. Crassa* after 48 hours.

| Sample | Yield (g L$^{-1}$) |
|---|---|
| Unsupplemented | 4.44 |
| Supplemented | 5.04 |

In another example, brewery residual water was collected from a microbrewery in Illinois. The water stream is left over from the initial beer making stream and is therefore food-grade. Growth experiments were performed over a 48 hour period. Harvested biomass was washed with deionized (DI) water, vacuum filtered, dehydrated at 57° C. for 8 hours, and used to produce an edible chip. In another implementation, the vacuum filtered biomass was brushed with sunflower oil prior to dehydration, dehydrated at 57° C. for 8 hours and used as an edible chip. In another implementation, the vacuum filtered biomass was deep fried to produce an edible chip. In still another implementation, the dehydrated biomass was finely ground to a powder, mixed with water to form a dough, sheeted and cut into rounds, dried, then deep fried to form an edible chip.

Figure 5:
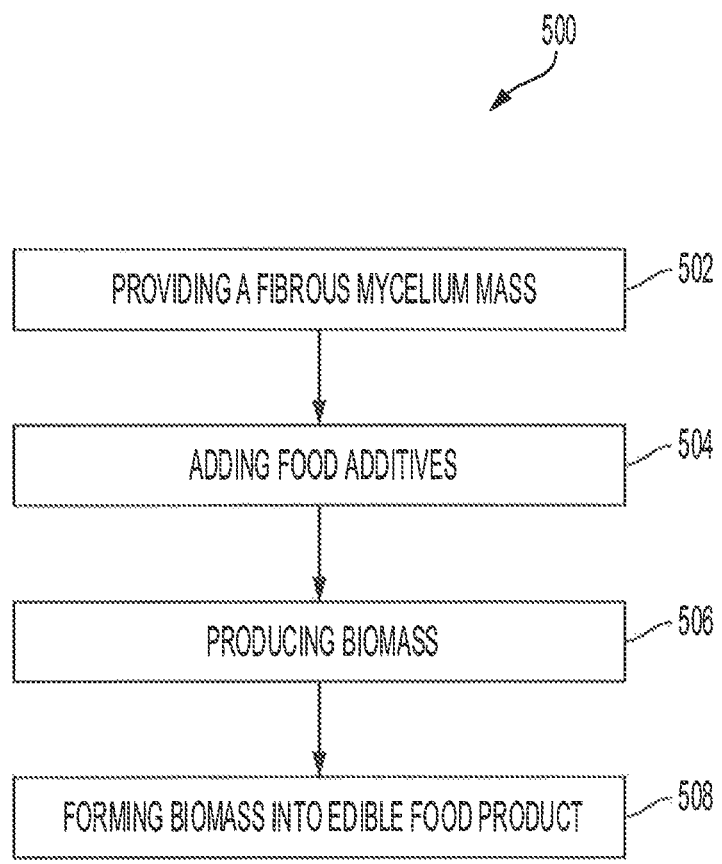
FIG. 5 illustrates a block diagram of an example method for forming an edible product from fungal mycelium, according to an embodiment.

FIG. 5 illustrates a block diagram of an example method 500 for forming an edible product from fungal mycelium, according to an embodiment. In brief overview, the method 500 includes providing a fibrous mycelium mass, at 502, adding food additives to the fibrous mycelium mass to produce a biomass, at 504, producing the biomass, at 506, and forming the biomass into an edible food product.

Expanding further, the method 500 includes providing a fibrous mycelium mass, at 502. The fibrous mycelium mass has a protein content of greater than 40 wt % of a dry mass of the mycelium. The fibrous mycelium mass can be produced using the operations of method 100 or any other fungal mycelium production method described herein.

At 504, food additives are added to the fibrous mycelium mass to produce a biomass. Any suitable food additive can be used such as, for example, vegetable or animal proteins, fats, emulsifiers, thickeners, stabilizers, flavoring, pH adjusters, oils, spices, salts, etc. For example, the biomass flavor can be enhanced by adding different oils. Non-limiting examples of oils include nut-derived, vegetable-derived, plant-derived, and animal-derived oils. Oils can be added to the food-grade residual water streams to have the multipurpose of acting as an antifoaming agent, a carbon source for the fungus, and to integrate extra/intracellularly into the biomass. Alternatively, oil can be integrated into the biomass following harvesting or following cooking.

Formed and partially dried biomass can have food additives introduced by various operations. For example, the biomass can be soaked in additional ingredients. The biomass can be injected with additional ingredients. The biomass can be coated in additional ingredients. Additional ingredients can be dispersed into the biomass by applying additional pressure or vacuum conditions. Additional ingredients can include vegetable or animal proteins, fats, emulsifiers, thickeners, stabilizers, flavoring, pH adjusters, etc.

The method 500 includes producing the biomass, at 506. Producing the biomass can include tuning texture of the biomass. Texture of the fungal biomass can be tuned by chemical washing of the biomass. Alternatively, texture can be altered by controlling the water content of the biomass. Texture can also altered through the addition of different nutrients which determine biomass growth and morphology. The density of final biomass can be controlled by altering initial water content and drying conditions to produce a heavier or lighter end product.

The raw biomass can be dried and ground to a powder or incremental fineness. The powder can then be used as a protein ingredient into human or animal feed. The powder can be formed with other ingredients and binders such as water and/or oil amongst others to form different shapes. Protein extraction can take place to create a fungal protein isolate. The isolate can be used as a human or animal feed ingredient.

At 508, the biomass is formed into an edible food product. Forming the biomass into an edible food product can include dehydrating the biomass, and/or pulverizing the biomass into a powder. For example, the powder can be added into smoothies, soups, stews, puddings, among others. The edible food product can include a chip, a protein bar, a jerky, a tortilla, a bread, or a cracker, that can, for example, be formed from the powdered the mycelium mass.

The edible food product can include a powdered edible product. The powdered edible product can include a powdered mycelium mass. The powdered mycelium mass can have a protein content of greater than 40 wt % of the powdered mycelium mass. The powdered edible product can include particles of the powder that can have a particle size of less than 150 µm. For example, the particles of the powder can have a particle size of 149 µm, 135 µm, 120 µm, 100 µm, 50 µm, 25 µm 10 µm, 5 µm, 2 µm, 1 µm, 0.5 µm, or 0.25 µm, inclusive. In some embodiments, the method 500 can include incorporating the powder into a baked food product. For example, the baked food product can include a biscuit, bread, brownie, cake, casserole, cookie, cracker, custard, pastry, pie, pudding, roast, and tart, among others. The baked food product can include 0.1-80 wt % fungal mycelium such as from *N. crassa* (e.g. 0.1 wt %, 1 wt %, 10 wt %, 20 wt %, 30 wt %, 40 wt %, 50 wt %, 60 wt %, 70 wt %, or 80%, inclusive). The baked food product can include 0-90 wt % carbohydrates (e.g., 0 wt %, 1 wt %, 10 wt %, 20 wt %, 30 wt %, 40 wt %, 50 wt %, 60 wt %, 70 wt %, 80 wt %, or 90 wt %, inclusive). The carbohydrates can include starch. The powdered mycelium mass of the powdered edible product can be in a range of 0.1 wt % to 80 wt % of a total mass of the powdered edible product (e.g., 0.1 wt %, 0.5 wt %, 1 wt %, 5 wt %, 10 wt %, 25 wt %, 50 wt %, 75 wt %, 80 or wt %, inclusive). The powdered edible product can include a carbohydrate in a range of 0 wt % to 90 wt % (e.g., 0.1 wt %, 0.5 wt %, 1 wt %, 5 wt %, 10 wt %, 25 wt %, 50 wt %, 75 wt %, 90 wt %). The powdered mycelium mass can include a combined methionine and cysteine content of at least 20 mg/gram crude protein (e.g., 20 mg/gram, 25 mg/gram, 30 mg/gram, etc.).

In one example, *N. crassa* was completely dehydrated at 74° C. until less than 10% moisture content by weight and pulverized into a powder of less than 150 um particles.

Conventional recipes using wheat flour or similar were then carried out and substituting *N. crassa* powder for anywhere between 1-100% of total flour weight. Products include chips, tortillas, bread, and crackers, among others.

In some embodiments, the method 500 can include molding the biomass into a shape. The raw biomass can be formed directly into the edible food product. Possible processes include extruding, sheeting, and molding, amongst others, to form different shapes such as bars, discs, and cylinders, amongst others. Once dried and/or flavoring added, the biomass form can be used in such applications as chips, protein bars, jerky, amongst others for human or animal consumption. The formed biomass can be cooked at elevated temperatures, freeze dried, dehydrated, or fried amongst others. Importantly, the final form factor can be created without the use of binders and is continuous biomass.

The biomass with added ingredients in a single or combination of ways. For example, the biomass can be cooked at a temperature of less than 100° C. (e.g., 90° C., 80° C., 75° C., or 50° C., inclusive) for 1-60 minutes in dry or steam environment. The biomass can be cooked at a temperature between 100° C.–200° C. (e.g., 100° C., 125° C., 150° C., or 200° C., inclusive) for 1-60 minutes in dry or steam environment. The biomass can be cooked in a water bath at less than 100° C. for 1-120 minutes.

In some embodiments, the biomass can be stored. The biomass can include additional ingredients. The biomass can be cooked. The biomass can be frozen at less than 0° C. under ambient or vacuum conditions, and/or refrigerated at less than 5° C. under ambient or vacuum conditions. The biomass can be stored indefinitely in sealed container.

In one example, biomass is separated using a cheese cloth and pressed in a cider press. The moisture content is 75%. The biomass is dried in a commercial dehydrator at variable temperature. At 40° C., drying takes approximately 3 hours to achieve a moisture content below 20%; at 60° C., drying takes approximately 2 hours to achieve a moisture content below 20%; at 75° C., drying takes approximately 1.5 hours to achieve a moisture content below 20%. Lower temperatures, while taking longer, allow for a whiter appearance of the final biomass as well as lower density due to individual hyphae remaining separated. Higher temperatures encourage coalescing of fungal hyphae together resulting in higher density and greater resilience.

In another example, the biomass is separated using a cheese cloth. The wet biomass is then directly added onto a heated drum dryer, heated to 110° C. using steam. The residual biomass collected from drum dryer had a moisture content less than 10% and had a thin film or flake quality. The dry biomass can be further processed to powder.

In another example, the biomass is separated using a cheese cloth. Food additives can be added to the wet biomass at this time, including pea protein at 10%, potato starch at 10%, canola oil at 5%, flax meal at 5%, or other additives. The concentrations of food additives are in relation to the dry biomass. The wet biomass is then pressed using a cider press.

In another example, the biomass is separated using a cheese cloth. The wet biomass is then added to a mold of variable shape. Pressure is added with a mold top and a dry, formed biomass is recovered. The formed sample can then be partially dehydrated or used as is, placed into a mold, or free-formed using a vacuum molding system. The biomass can be a partially dry biomass. The partially dry biomass can be formed using pressure molding. The partially dry biomass can be formed using vacuum molding. Molded samples can then be directly frozen to be shipped for continued processing.

In another example, a solution containing primarily water, 5% pea protein, and 0.25% carrageenan, and seasonings was mixed. Formed, partially dried biomass was allowed to soak in solution. Alternatively, the solution was injected in precise amounts into the formed biomass. The sample was then pressed to disperse the solution into the mold. Samples were then cooked at 180° F. for 30 minutes in an oven to denature the protein. Alternatively, a vacuum mold was used to disperse the solution, then the samples were cooked in a sealed vacuum pouch in a water batch at 180° F. for 30 minutes. Samples could then be cooked at higher temperatures, served, or frozen.

FIGS. 6A1 and 6A2 illustrates top and side views, respectively, of a food product that includes fungal mycelium that is configured as a chip, according to an embodiment. The chip can be a wavy chip, a corrugated chip, a textured chip, or have any other suitable size or shape. FIGS. 6B1 and 6B2 illustrates top and side views, respectively, of a food product configured as an oval chip, according to an embodiment. FIGS. 6C1 and 6C2 illustrates top and side views, respectively, of a food product configured as a triangular chip, according to another embodiment.

The edible food product may include a chip. The chip can include an edible chip. The edible chip can include an edible body. The edible body can include a fibrous mycelium mass. The fibrous mycelium mass can be in a range of 0.1 wt % to 90 wt % (e.g., 0.1 wt %, 0.5 wt %, 1 wt %, 5 wt %, 10 wt %, 25 wt %, 50 wt %, 75 wt %, or 90 wt %, inclusive). The fibrous mycelium mass can have a protein content of greater than 40 wt % of a dry mass of the fibrous mycelium mass. The edible chip can include a water content of less than 20 wt % (e.g., 15 wt %, 10 wt %, 5 wt %, 2 wt %, 1 wt %, or 0 wt %, inclusive). The edible chip can include a carbohydrate content in a range of 0 wt % to 90 wt % (e.g., 0 wt %, 0.5 wt %, 1 wt %, 5 wt %, 10 wt %, 25 wt %, 50 wt %, 75 wt %, or 90 wt %, inclusive). The fibrous mycelium mass can be distributed throughout the edible body. For example, the fibrous mycelium mass can be distributed evenly throughout the edible body. In other embodiments, the fibrous mycelium mass can be located in concentrated areas throughout the edible body.

The edible body can have a diameter that is more than 10 times a thickness of the edible body. For example, the thickness of the edible body can be 1 mm and the diameter can be 40 mm. The thickness of the edible body can be 1 mm and the diameter can be 60 mm. The thickness of the edible body can be 2 mm and the diameter can be 50 mm. The thickness of the edible body can be 2 mm and the diameter can be 75 mm. The thickness of the edible body can be 1.5 mm and the diameter can be 45 mm. The thickness of the edible body can be 1.5 mm and the diameter can be 50 mm. It should be appreciated that while particular dimensions of the edible body are described herein, these are mere examples, and edible bodies having other dimensions should be considered within the scope of this disclosure.

The edible chip can include a flavorant. A flavorant can include flavorings or food additives. For example, the flavorant can include an oil, such as a nut-derived oil, vegetable-derived oil, plant-derived oil, and/or animal-derived oil. In some embodiments, the flavorant can include salt, pepper, or a spice (e.g., black pepper, fennel, mustard, nutmeg, cinnamon, ginger, cayenne pepper, clove, turmeric, etc.). In some embodiment, the flavorant can include a flavored powder (e.g., onion powder, garlic powder, BBQ powder, sour cream powder, lemon powder, lime powder, etc.).

The fibrous mycelium mass can include a combined methionine and cysteine content of at least 20 mg/gram crude protein (e.g., 20 mg/gram, 25 mg/gram, or 30 mg/gram, inclusive). The fibrous mycelium mass can have a protein digestibility-corrected amino acid score (PDCAAS) score of 1. The PDCAAS can include a method of evaluating the quality of a protein based on both the amino acid requirements of humans and the ability of humans to digest the protein.

Figure 7:
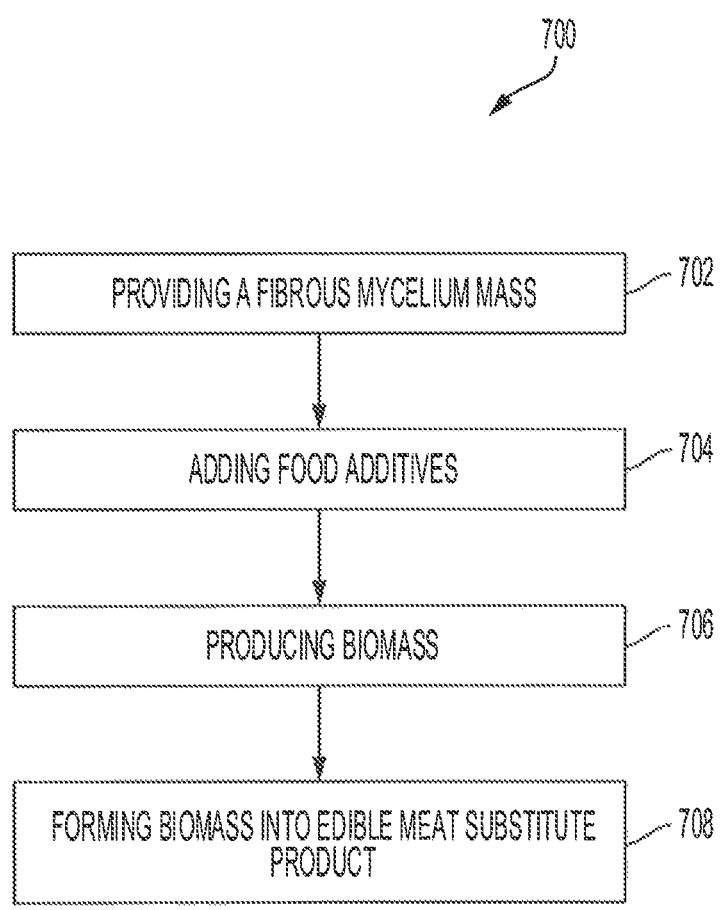
FIG. 7 illustrates a block diagram of an example method for forming an edible meat substitute product from fungal mycelium, according to an embodiment.

FIG. 7 illustrates a block diagram of an example method 700 for forming an edible meat substitute product from fungal mycelium, according to an embodiment. In brief overview, the method 700 includes providing a fibrous mycelium mass, 702), adding food additives to the fibrous mycelium mass to produce a biomass, at 704 producing the biomass, at 706, and forming the biomass into the edible meat substitute product, at 708.

Expanding further, the method 700 includes providing a fibrous mycelium mass, at 702. The fibrous mycelium mass can have a protein content of greater than 40 wt % of a dry mass of the mycelium. The fibrous mycelium mass can be produced using the operations of method 100 or any other method described herein.

The method 700 can include adding food additives to the fibrous mycelium mass to produce a biomass, at 704. Adding food additives to the fibrous mycelium mass can include adding seasonings to the biomass. The biomass flavor can be enhanced by adding different oils. Non-limiting examples of oils include nut-derived, vegetable-derived, plant-derived, and animal-derived. Oils can be added to the food-grade residual water streams to have the multi-purpose of acting as an antifoaming agent, a carbon source for the fungus, and to integrate extra/intracellularly into the biomass. Alternatively, oil can be integrated into the biomass following harvesting or following cooking.

Formed and partially dried biomass can have food additives introduced by various operations. For example, the biomass can be soaked in additional ingredients. The biomass can be injected with additional ingredients. The biomass can be coated in additional ingredients. Additional ingredients can be dispersed into the biomass by applying pressure or under vacuum conditions. Additional ingredients can include vegetable or animal proteins, fats, emulsifiers, thickeners, stabilizers, flavoring, pH adjusters, spices, salts, etc.

The method 700 includes producing the biomass, at 706. Producing the biomass can include tuning texture of the biomass. Texture of the fungal biomass can be tuned by chemical washing of the biomass. Alternatively, texture can be altered by controlling the water content of the biomass. Texture can also be altered through the addition of different nutrients which determine biomass growth and morphology. The density of final biomass can be controlled by altering initial water content and drying conditions to produce a heavier or lighter end product.

The raw biomass can be dried and ground to a powder or incremental fineness. The powder can then be used as a protein ingredient into human or animal feed. The powder can be formed with other ingredients and binders such as water and/or oil amongst others to form different shapes. Protein extraction can take place to create a fungal protein isolate. The isolate can be used as a human or animal feed ingredient.

The method 700 can include forming the biomass into the edible meat substitute product, at 708. Forming the biomass into the edible meat substitute product can include adding at least one soluble protein to the biomass. Forming the biomass into the edible meat substitute product can include adding at least one thickener to the biomass. Forming the biomass into the edible meat substitute product can include adding at least one fat source to the biomass. Forming the biomass into the edible meat substitute product can include molding the biomass into the edible meat substitute product.

The edible meat substitute product can include a fibrous mycelium mass in a range of 10 wt % to 100 wt % (e.g., 10 wt %, 20 wt %, 30 wt %, 40 wt %, 50 wt %, 60 wt %, 70 wt %, 80 wt %, or 100 wt %, inclusive). The edible meat substitute product can have a water content in a range of 0 wt % to 100 wt % (e.g., 0 wt %, 10 wt %, 20 wt %, 30 wt %, 40 wt %, 50 wt %, 60 wt %, 70 wt %, 80 wt %, or 100 wt %, inclusive). In some embodiments, the fibrous mycelium mass is in a range of 10 wt % to 50 wt %, and the water content is in a range of 50 wt % to 90 wt %. In some embodiments, the edible meat substitute product includes a soluble protein in a range of 1 wt % to 20 wt % (e.g., 1 wt %, 2 wt %, 5 wt %, 10 wt %, 15 wt %, or 20 wt %, inclusive). The edible meat substitute product can include a thickener content in a range of 0.01 wt to 5 wt % (e.g., 0.01 wt %, 0.05 wt %, 0.1 wt %, 1 wt %, 2 wt %, or 5 wt %, inclusive). The edible meat substitute product can include a fat source in a range of 0 wt % to 10 wt % (e.g., 0 wt %, 0.5 wt %, 1 wt %, 2 wt %, 5 wt %, or 10 wt %, inclusive).

The edible meat substitute product can include a flavorant. A flavorant can include flavorings or food additives. For example, the flavorant can include an oil, such as a nut-derived oil, vegetable-derived oil, plant-derived oil, and animal-derived oil. The flavorant can include spices (e.g., black pepper, fennel, mustard, nutmeg, cinnamon, ginger, cayenne pepper, clove, etc.). The flavorant can include a flavored powder (e.g., onion powder, garlic powder, BBQ powder, sour cream powder, lemon powder, lime powder, etc.).

The edible meat substitute product can include a combined methionine and cysteine content of at least 20 mg/gram crude protein. In some embodiments, the combined methionine and cysteine content in the edible meat substitute product is in a range of 20 mg/gram to 30 mg/gram (e.g., 20 mg/gram, 25 mg/gram, or 30 mg/gram, inclusive). The edible meat substitute product can have a PDCAAS score of 1. The edible meat substitute product can have an internal pH in a range of 2 to 9 (e.g., 2, 3, 4, 5, 6, 7, 8, or 9, inclusive). The edible meat substitute product can have a protein dry weight in a range of 20 wt % to 70 wt % (e.g., 20 wt %, 30 wt %, 40 wt %, 50 wt %, 60 wt %, or 70 wt %, inclusive). The edible meat substitute product can have a fiber dry weight in a range of 5 wt % to 30 wt % (e.g., 5 wt %, 10 wt %, 15 wt %, 20 wt %, 25 wt %, or 30 wt %, inclusive). The edible meat substitute product can have a dry fat weight of 0 wt % to 20 wt % (e.g., 0 wt %, 1 wt %, 5 wt %, 10 wt %, 15 wt %, or 20 wt %, inclusive). The edible meat substitute product can have a color represented by a CIE L* value of greater than 55. The edible meat substitute product can have a Warner-Bratzler shear force of greater than 15 N. The edible meat substitute product can have a hardness of greater than 50 N.

The edible meat substitute product can include a chicken substitute product, a beef substitute product, a pork substitute product, a veal substitute product, or a fish substitute product. The edible meat substitute product can include 10 wt % to 90 wt % of the fibrous mycelium mass (e.g., 10 wt %, 20 wt %, 30 wt %, 40 wt %, 50 wt %, 60 wt %, 70 wt %, 80 wt %, or 90 wt %, inclusive).

The chicken substitute product can include 50-90 wt % water (e.g., 50 wt %, 60 wt %, 70 wt %, 80 wt %, or 90 wt %, inclusive). The chicken substitute product can include 10-50 wt % fungal mycelium such as from *N. crassa* (e.g., 10 wt %, 20 wt %, 30 wt %, 40 wt %, or 50 wt %, inclusive). The chicken substitute product can include 1-20 wt % soluble protein (e.g., 1 wt %, 2 wt %, 5 wt %, 10 wt %, or 20 wt %, inclusive). The soluble protein can include pea, egg white, and potato, among others. The chicken substitute product can include 0.01-5 wt % thickener (e.g., 0.01 wt %, 0.05 wt %, 0.1 wt %, 1 wt %, 2 wt %, or 5 wt %, inclusive). The thickener can include pectin, carrageenan, agar, among others. The chicken substitute product can include 0-10 wt % fat source (0 wt %, 1 wt %, 2 wt %, 3 wt %, 4 wt %, 5 wt %, or 10 wt %, inclusive). The fat source can include vegetable oils, seeds, among others. The chicken substitute product can include seasonings. The chicken substitute product can have various physical properties. For example, the chicken substitute product can have an internal pH between 2 and 9 (e.g., 2, 3, 4, 5, 6, 7, 8, or 9, inclusive). The chicken substitute product can have a 40-70 wt % protein dry weight (e.g., 40 wt %, 45 wt %, 50 wt %, 55 wt %, 60 wt %, 65 wt %, or 70 wt %). The chicken substitute product can have a 5-30 wt % fiber dry weight (e.g., 5 wt %, 10 wt %, 15 wt %, 20 wt %, 25 wt %, or 30 wt %, inclusive). The chicken substitute product can have a 0-10 wt % fat dry weight (0 wt %, 1 wt %, 2 wt %, 4 wt %, 5 wt %, or 10 wt %, inclusive). The chicken substitute product can have a CIE L* value greater than 55. The chicken substitute product can have a Warner-Bratzler shear force greater than 15 N. The chicken substitute product can have a hardness greater than 50 N.

In one example for producing a chicken substitute product, a solution containing primarily water, 5% pea protein, and 0.25% carrageenan, and seasonings was mixed. Formed, partially dried biomass was allowed to soak in solution. Alternatively, the solution was injected in precise amounts into the formed biomass. The sample was then pressed to disperse the solution into the mold. Samples were then cooked at 180° F. for 30 minutes in an oven to denature the protein. Alternatively, a vacuum mold was used to disperse the solution, then the samples were cooked in a sealed vacuum pouch in a water batch at 180° F. for 30 minutes. Samples could then be cooked at higher temperatures, served, or frozen.

The meat substitute product can include 0-90 wt % water (e.g., 0 wt %, 10 wt %, 20 wt %, 30 wt %, 40 wt %, 50 wt %, 60 wt %, 70 wt %, 80 wt %, or 90 wt %, inclusive). The meat substitute product can include 10-100 wt % fungal mycelium such as from *N. crassa* (e.g., 10 wt %, 20 wt %, 30 wt %, 40 wt %, 50 wt %, 60 wt %, 70 wt %, 80 wt %, 90 wt %, or 100 wt %, inclusive). The meat substitute product can include 1-20 wt % soluble protein (e.g., 1 wt %, 2 wt %, 5 wt %, 10 wt %, or 20 wt %, inclusive). The soluble protein can include pea, egg white, and potato, among others. The meat substitute product can include 0-5 wt % thickener (e.g., 0 wt %, 0.01 wt %, 0.05 wt %, 0.1 wt %, 1 wt %, 2 wt %, or 5 wt %, inclusive). The thickener can include pectin, carrageenan, agar, among others. The meat substitute product can include 0-50 wt % fat source (0 wt %, 10 wt %, 20 wt %, 30 wt %, 40 wt %, or 50 wt %, inclusive). The fat source can include vegetable oils, seeds, among others. The meat substitute product can include seasonings.

In one example for producing a meat substitute product, *N. crassa* was completely dehydrated at 74° C. until the biomass had less than 10% moisture content by weight. Dry *N. crassa* is then rehydrated in a "marinade" consisting of sauce, Worcestershire sauce, vegetable oil, and seasonings. The marinated *N. crassa* is then dehydrated at 74° C. until approximately the biomass had 30 wt % moisture content.

The biomass flavor can be enhanced by adding different oils. Non-limiting examples of oils include nut-derived, vegetable-derived, plant-derived, and animal-derived. Oils can be added to the food-grade residual water streams to have the multi-purpose of acting as an antifoaming agent, a carbon source for the fungus, and to integrate extra/intracellularly into the biomass. Alternatively, oil can be integrated into the biomass following harvesting or following cooking.

Texture of the fungal biomass can be tuned by chemical washing of the biomass. Alternatively, texture can be altered by controlling the water content of the biomass. Texture can also altered through the addition of different nutrients which determine biomass growth and morphology. The density of final biomass can be controlled by altering initial water content and drying conditions to produce a heavier or lighter end product.

In one example, *N. crassa* was grown and harvested. The biomass is separated using a cheese cloth. Following gravity draining, the moisture content is approximately 95%. The biomass is washed with a variety of different solutions including tap water, ethanol, 1 M citric acid, or 0.1 M calcium hydroxide. The biomass is pressed in a cider press. Following pressing, the moisture content is approximately 75 wt %. Samples washed with ethanol had a 68% moisture content. The wet biomass is then tested for any residual sugar content from media. Unwashed biomass registered 3 g/L sugar in media, water washed biomass registered approximately 0.5 g/L sugar, ethanol washed biomass registered 0.4 g/L sugar, 1 M citric acid and 0.1 M calcium hydroxide registered less than 0.1 g/L sugar.

The raw biomass can be formed directly into the edible meat substitute. Possible processes include extruding, sheeting, and molding, amongst others, to form different shapes such as bars, discs, and cylinders, amongst others. Once dried and/or after flavorings are added to the biomass, the biomass can be used to form edible products such as chips, protein bars, jerky, amongst others for human or animal consumption. The formed biomass can be cooked at elevated temperatures, freeze dried, dehydrated, or fried amongst others. Importantly, the final form factor can be created without the use of binders and is a continuous biomass.

The raw biomass can be dried and ground to a powder or incremental fineness. The powder can then be used as a protein ingredient into human or animal feed. The powder can be formed with other ingredients and binders such as water and/or oil amongst others to form different shapes. Protein extraction can take place to create a fungal protein isolate. The isolate can be used as a human or animal feed ingredient.

Figure 8A:
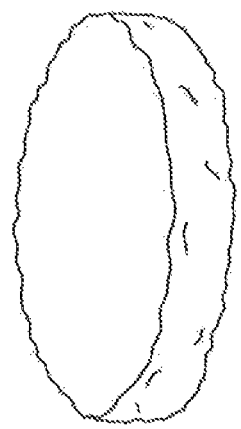
FIG. 8A illustrates a perspective view of an edible meat substitute food product configured as a patty, according to an embodiment.
Figure 8B:
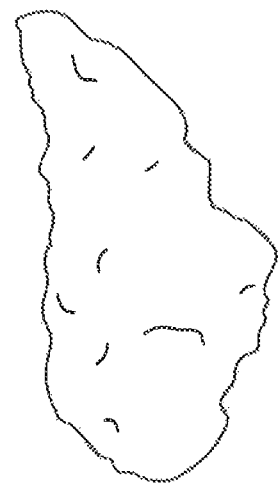
FIG. 8B illustrates a perspective view of an edible meat substitute product configured as a tender, according to an embodiment.
Figure 8C:
FIG. 8C illustrates a perspective view of a ground edible meat substitute product, according to an embodiment.

FIG. 8A illustrates a perspective view of an edible meat substitute food product configured as a patty, according to an embodiment. The patty can be a patty for a burger or sandwich. FIG. 8B illustrates a perspective view of an edible meat substitute product configured as a tender, according to an embodiment. The tender can be a meat substitute tender, strip, fillet, nugget, amongst others. FIG. 8C illustrates a perspective view of a ground edible meat substitute product, according to an embodiment.

In some embodiments, an edible meat substitute product includes a fibrous mycelium mass in a range of 10 wt % to 100 wt %, the fibrous mycelium mass having a protein content of greater than 40 wt % of a dry mass of the fibrous mycelium mass, and a water content in a range of 0 wt % to 90 wt %. In some embodiments, the fibrous mycelium mass is in a range of 10 wt % to 50 wt %, and the water content is in a range of 50 wt % to 90 wt %.

In some embodiments, the edible meat substitute product further includes a soluble protein in a range of 1 wt % to 20 wt %, and a thickener content in a range of 0.01 wt to 5 wt %. In some embodiments, the edible meat substitute product further includes a fat source in a range of 0 wt % to 10 wt %. In some embodiments, the edible meat substitute product further includes a soluble protein in a range of 0.01 wt % to 20 wt %, a thickener content in a range of 0.01 wt % to 5 wt %, and a fat source in a range of 0 wt % to 50 wt %.

In some embodiments, the edible meat substitute product further includes a flavorant. In some embodiments, the fibrous mycelium mass includes a combined methionine and cysteine content of at least 20 mg/gram crude protein. In some embodiments, the fibrous mycelium mass has a protein digestibility-corrected amino acid (PDCAAS) score of 1. In some embodiments, the edible meat substitute product has an internal pH in a range of 2 to 9, a protein dry weight in a range of 20 wt % to 70 wt %, a fiber dry weight in a range of 5 wt % to 30 wt %, and a dry fat weight of 0 wt % to 20 wt %. In some embodiments, the edible meat substitute product has a color represented by a CIE L* value of greater than 55, a Warner-Bratzler shear force of greater than 15 N, and a hardness of greater than 50 N.

In some embodiments, an edible chip includes an edible body comprising a fibrous mycelium mass in a range of 0.1 wt % to 90 wt %, the fibrous mycelium mass having a protein content of greater than 40 wt % of a dry mass of the fibrous mycelium mass, a water content of less than 20 wt %, and a carbohydrate content in a range of 0 wt % to 90 wt %. The fibrous mycelium mass is distributed throughout the edible body.

In some embodiments, the edible body has a diameter that is more than 10 times a thickness of the edible body. In some embodiments, the edible body also includes a flavorant. In some embodiments, the fibrous mycelium mass comprises a combined methionine and cysteine content of at least 20 mg/gram crude protein. In some embodiments, the fibrous mycelium mass has PDCAAS score of 1.

In some embodiments, a powdered edible product includes a powdered mycelium mass having a protein content of greater than 40 wt % of the powdered mycelium mass.

In some embodiments, particles of the powdered mycelium mass have a particle size of less than 150 µm. In some embodiments, the powdered mycelium mass is in a range of 0.1 wt % to 80 wt % of a total mass of the powdered edible product, and wherein the powdered edible product further comprises a carbohydrate in a range of 0 wt % to 90 wt %. In some embodiments, the powdered mycelium mass comprises a combined methionine and cysteine content of at least 20 mg/gram crude protein. In some embodiments, the powdered mycelium mass has PDCAAS score of 1.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An edible meat substitute product, comprising:
   a fibrous mycelium mass in a range of 10 wt % to 100 wt %, the fibrous mycelium mass having a protein content of greater than 40 wt % of a dry mass of the fibrous mycelium mass, wherein the fibrous mycelium mass is a mass of fungal cells from the species *Neurospora crassa*; and
   a water content in a range of 0 wt % to 90 wt %.

2. The edible meat substitute product of claim 1, wherein the fibrous mycelium mass is in a range of 10 wt % to 50 wt %, and the water content is in a range of 50 wt % to 90 wt %.

3. The edible meat substitute product of claim 2, further comprising:
   a soluble protein in a range of 1 wt % to 20 wt %; and
   a thickener content in a range of 0.01 wt % to 5 wt %.

4. The edible meat substitute product of claim 3, further comprising a fat source in a range of 0 wt % to 10 wt %.

5. The edible meat substitute product of claim 1, further comprising:
   a soluble protein in a range of 0.01 wt % to 20 wt %;
   a thickener content in a range of 0.01 wt % to 5 wt %; and
   a fat source in a range of 0 wt % to 50 wt %.

6. The edible meat substitute product of claim 1, further comprising a flavorant.

7. The edible meat substitute product of claim 1, wherein the fibrous mycelium mass has a combined methionine and cysteine content of at least 20 mg/gram crude protein.

8. The edible meat substitute product of claim 1, wherein the fibrous mycelium mass has a protein digestibility-corrected amino acid (PDCAAS) score of 1.

9. The edible meat substitute product of claim 1, wherein the edible meat substitute product has an internal pH in a range of 2 to 9, a protein dry weight in a range of 20 wt % to 70 wt %, a fiber dry weight in a range of 5 wt % to 30 wt %, and a dry fat weight of 0 wt % to 20 wt %.

10. The edible meat substitute product of claim 9, wherein the edible meat substitute product has a color represented by a CIE L* value of greater than 55, a Warner-Bratzler shear force of greater than 15 N, and a hardness of greater than 50 N.

11. An edible chip, comprising:
    an edible body comprising a fibrous mycelium mass in a range of 0.1 wt % to 90 wt %, the fibrous mycelium mass having a protein content of greater than 40 wt % of a dry mass of the fibrous mycelium mass, wherein the fibrous mycelium mass is a mass of fungal cells from the species *Neurospora crassa*;
    a water content of less than 20 wt %; and
    a carbohydrate content in a range of 0 wt % to 90 wt %, wherein the fibrous mycelium mass is distributed throughout the edible body.

12. The edible chip of claim 11, wherein the edible body has a diameter that is more than 10 times a thickness of the edible body.

13. The edible chip of claim 11, further comprising a flavorant.

14. The edible chip of claim 11, wherein the fibrous mycelium mass has a combined methionine and cysteine content of at least 20 mg/gram crude protein.

15. The edible chip of claim 11, wherein the fibrous mycelium mass has a PDCAAS score of 1.

16. A powdered edible product, comprising:
    a powdered mycelium mass having a protein content of greater than 40 wt % of the powdered mycelium mass, wherein the powdered mycelium mass is a mass of fungal cells from the species *Neurospora crassa*.

17. The powdered edible product of claim 16, wherein particles of the powdered mycelium mass have a particle size of less than 150 μtm.

18. The powdered edible product of claim 16, wherein the powdered mycelium mass is in a range of 0.1 wt % to 80 wt % of a total mass of the powdered edible product, and wherein the powdered edible product further comprises a carbohydrate in a range of 0 wt % to 90 wt %.

19. The powdered edible product of claim 16, wherein the powdered mycelium mass has a combined methionine and cysteine content of at least 20 mg/gram crude protein.

20. The powdered edible product of claim 16, wherein the powdered mycelium mass has a PDCAAS score of 1.

* * * * *

UNITED STATES PATENT AND TRADEMARK OFFICE
CERTIFICATE OF CORRECTION

| | |
|---|---|
| PATENT NO. | : 11,751,596 B2 |
| APPLICATION NO. | : 16/435269 |
| DATED | : September 12, 2023 |
| INVENTOR(S) | : Tyler Huggins et al. |

It is certified that error appears in the above-identified patent and that said Letters Patent is hereby corrected as shown below:

In the Claims

In Claim 17, Column 24, Line 62, "less than 150 μtm." should read --less than 150 μm.--.

Signed and Sealed this
Fourteenth Day of November, 2023

Katherine Kelly Vidal
*Director of the United States Patent and Trademark Office*